United States Patent [19]
Garcete

[11] Patent Number: 6,081,943
[45] Date of Patent: Jul. 4, 2000

[54] PORTABLE PERSONAL TOILET FACILITY DEVICE

[76] Inventor: Codi Garcete, 29 Old Country Rd., East Quogue, N.Y. 11942

[21] Appl. No.: 08/792,773

[22] Filed: Feb. 3, 1997

Related U.S. Application Data

[60] Provisional application No. 60/011,036, Feb. 2, 1996.
[51] Int. Cl.[7] ................................................. A47K 11/06
[52] U.S. Cl. ........................................ 4/476; 4/484; 4/483
[58] Field of Search ................................ 4/476, 483, 484

[56] References Cited

U.S. PATENT DOCUMENTS

| | | | |
|---|---|---|---|
| 1,567,484 | 12/1925 | Beard | 4/460 X |
| 2,495,374 | 1/1950 | Horn | 4/476 |
| 3,118,146 | 1/1964 | Dorey | 4/484 X |
| 3,381,315 | 5/1968 | Glassberg | 4/484 |
| 3,416,164 | 12/1968 | Ekrut | 4/484 |

FOREIGN PATENT DOCUMENTS

| | | | |
|---|---|---|---|
| 2232079 | 12/1990 | United Kingdom | 4/476 |

*Primary Examiner*—Robert M. Fetsuga
*Attorney, Agent, or Firm*—Christopher R. Pastel

[57] ABSTRACT

A portable personal toilet facility device that is easily and conveniently carried by one person comprises a case, a seat with an opening, a disposable container detachably attached to the seat effective to receive a waste deposited through the opening, and at least one compartment effective to store the disposable container. The case has a closed configuration that is effective to store the disposable container, the seat, and the waste, without spillage of solids and liquids, and without release of odors, in any orientation position of the case relative to the ground.

5 Claims, 6 Drawing Sheets

PORTABLE PERSONAL TOILET FACILITY DEVICE

This application claims benefit of provisional application Ser. No. 60/011,036filed Feb. 02, 1996.

BACKGROUND OF THE INVENTION

The present invention relates to a portable personal toilet facility device. More specifically, the present invention relates to a device which enables a person to transport a light and convenient toilet facility for easy and sanitary relief of toilet needs.

In particular, the present invention relates to a device which is self-contained and features disposable containers which hold excretions and used wipes. The present invention relates to a device with a privacy screen and a folding seat support. The present invention relates to a device which is collapsible to a visually pleasant form.

Presently, there are few choices for children and adults in situations without ready access to a bathroom. Such situations include people who drive long distances, truck drivers, people in unfamiliar areas, and the ill or elderly who are restricted in their mobility. Very young children can often be allowed to relieve themselves by the side of the road without embarrassment, but others usually must control their needs until a restroom is available.

In the prior art, one personal portable toilet facility device consists of a pan which is placed beneath a person. The pan must be emptied and cleaned regularly to prevent potentially dangerous unsanitary conditions. Furthermore, such pans are uncomfortable, awkward to use, and unsightly.

In another prior art, a personal portable toilet facility device consists of a bucket shaped container with a seat support and a cover. The bucket shape device awkwardly takes up a large space. Consequently, the bucket device cannot be conveniently carried around with a person.

Another prior art consists of a collapsible scissor action chair stool which has a hole in the seat of the chair. A flexible bag is hung from the chair seat to catch excretions. This stool device is awkward and unsightly for routine use. Further, the device does not hide the functions to which it is put.

OBJECTS AND SUMMARY OF THE INVENTION

It is an object of the present invention to overcome the limitations of the prior art.

The object of the present invention is to provide a device for an attractive, portable, fold-up personal toilet facility which can be routinely carried with a person for convenient access to sanitary needs.

It is an object of the present invention to provide a portable toilet facility that is easily and conveniently carried by one person.

It is an object of the present invention to provide a portable toilet facility which includes a shield to keep private the user during use.

It is an object of the present invention to provide a portable toilet facility which carries a supply of disposable items for use and which carries used supplies for environmentally friendly disposal later.

It is an object of the present invention to provide a portable toilet facility which carries used supplies, including used disposable containers containing waste, without spillage of liquids or solids, and without odors emanating from the portable toilet facility.

It is an object of the present invention to provide a portable toilet facility which supports the user at a convenient position during use.

Briefly stated, a portable personal toilet facility device that is easily and conveniently carried by one person comprises a case, a seat with an opening, a disposable container detachably attached to the seat effective to receive a waste deposited through the opening, and at least one compartment effective to store the disposable container. The case has a closed configuration that is effective to store the disposable container, the seat, and the waste, without spillage of solids and liquids, and without release of odors, in any orientation position of the case relative to the ground.

According to an embodiment of the present invention, a portable personal toilet facility device comprises a case, a seat with an opening effective to allow a waste to pass through the opening, at least one compartment effective to store new and used supplies, and the case having a closed configuration effective to store the new and used supplies, the seat, and the waste, without spillage of solids and liquids, and without release of odors, in any orientation position of the case relative to the ground.

According to an embodiment of the present invention, a portable personal toilet facility device comprises a case, a seat with an opening, a disposable container detachably attached to the seat effective to receive a waste deposited through the opening at least one compartment effective to store the disposable container, and the case having a closed configuration effective to store the disposable container, the seat, and the waste, without spillage of solids and liquids, and without release of odors, in any orientation position of the case relative to the ground.

According to another embodiment of the present invention, a portable personal toilet facility device comprises a top, a lid, a seat with an opening, a disposable container detachably attached to the seat effective to receive a waste deposited through the opening, a bottom, at least one compartment effective to store the disposable container when the disposable container is not attached to the seat, the top, the lid, the seat, and the bottom being in a constrained movable relationship to each other, wherein the constrained movable relationship has an open use configuration and a closed configuration, and wherein the closed configuration is effective, in any orientation of the closed configuration relative to the ground, to prevent spillage of solids and liquids from within the top and the bottom, and is effective to prevent odors to emanate from within the top and the bottom.

According to another embodiment of the present invention, a portable personal toilet facility device comprises a top, a lid rotatably connected to the top, a bottom rotatably connected to the top, a case formed by the top and the bottom, a seat with an opening, the seat rotatably connected to the case, a disposable container detachably attached to the seat effective to receive a waste deposited through the opening, at least one compartment effective to store the disposable container when the disposable container is not attached to the seat, the top, the lid, the seat, and the bottom being in a constrained movable relationship to each other, wherein said constrained movable relationship having an open use configuration and a closed configuration, and wherein the closed configuration is effective, in any orientation of the closed configuration relative to the ground, to prevent spillage of solids and liquids from within the top and the bottom, and is effective to prevent odors to emanate from within the top and the bottom.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
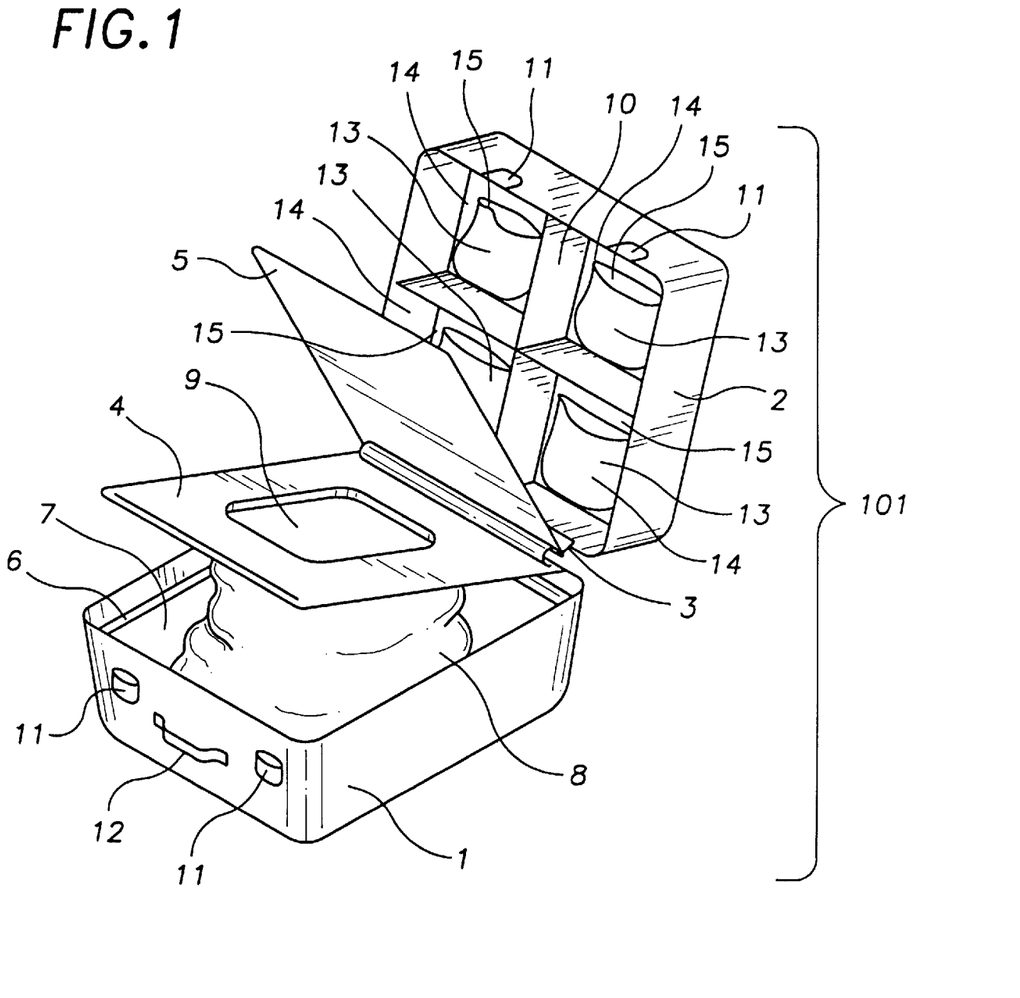
FIG. 1 is a perspective view of a portable personal toilet facility device according to an embodiment of the present invention.

The present invention relates to a portable personal toilet facility device. Referring to FIG. 1, a perspective view of a portable personal toilet facility device of the present invention is shown generally at 101. A case bottom 1 is attached to a case top 2 by a hinge 3. Also attached to case bottom 1 by hinge 3 is a seat 4 and a sealing lid 5.

Case bottom 1 has a lip stop 6 at an inner surface 7 which defines the inside of ease bottom 1. Lip stop 6 prevents seat 4 from traveling past a position defined by the dimensional position of lip stop 6. Case stop 1, lip stop 6, and seat 4 supports a user of the portable personal toilet facility device 101.

A disposable container 8 is detachably attached to seat 4 and is accessible through an opening 9 in seat 4. Disposable container 8 is contained by inner surface 7 which is a compartment being the inside of case bottom 1. Sealing lid 5 covers opening 9 when case top 2 is in a closed position with case bottom 1.

In the closed position of case top 2 and case bottom 1, closing one or more of a set of catches 11 causes a partition wall 10 to press against sealing lid 5. The pressure from partition wall 10 causes sealing lid 5 to seal opening 9 in seat 4 to prevent any leakage of contents from disposable container 8. Thus, in the closed position with catches 11 closed, portable personal toilet facility device 101 can be carried by handle 12 without leakage of contents from disposable container 8.

Partition wall 10 divides case top into a plurality of compartments 14. A sealable container 13 which holds supplies is detachably fixed to a surface 15 of compartment 14.

In this embodiment, it is most convenient that case top 2, case bottom 1, seat 4, and sealing lid 5 all pivot about the same hinge 3. However, it is clear that the different pairs of components can pivot about their own hinges relative to each other. For example, seat 4 can pivot about a hinge at the front of case bottom 1 opposite to hinge 3. As another example, sealing lid 5 can be hinged at the side of case top 2.

Further, sealing lid 5 can be attached by an open interlocking half hinge so that sealing lid 5 can be easily removed for washing.

Figure 2:
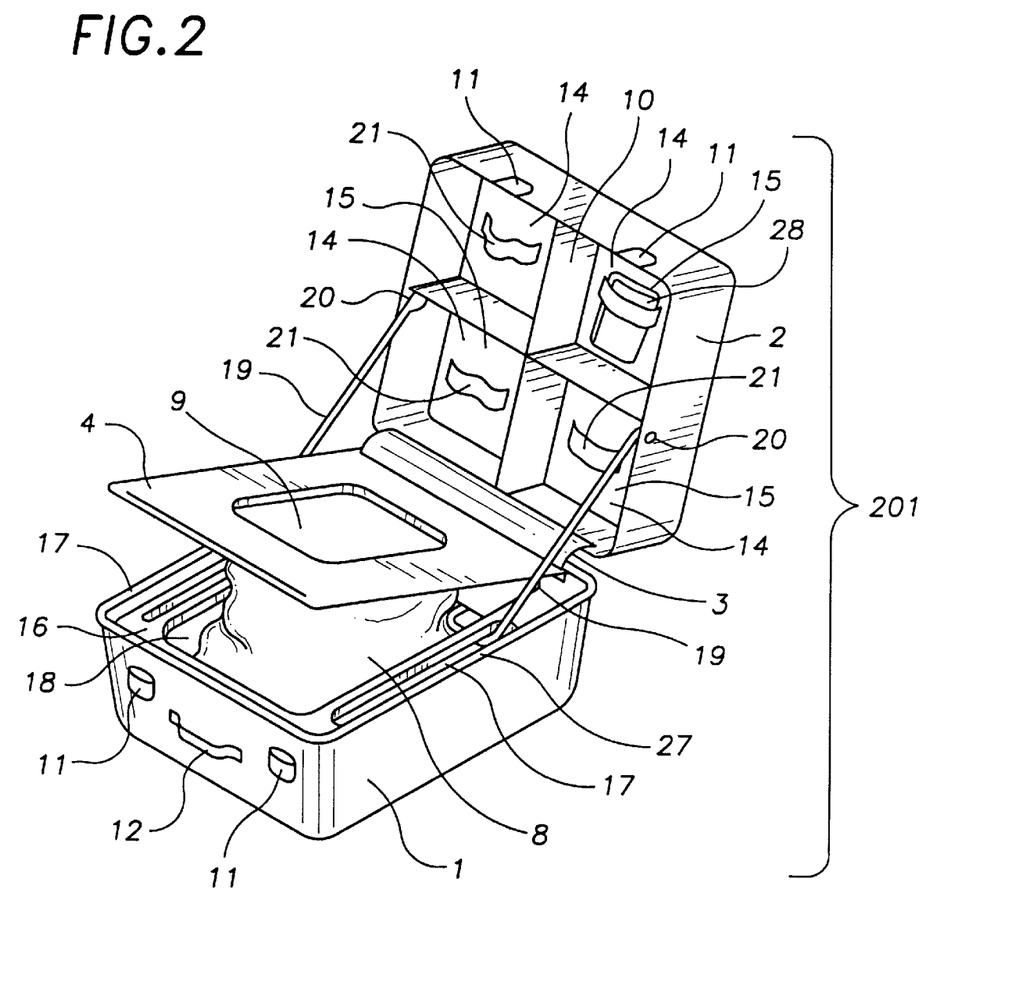
FIG. 2 is a perspective view of a portable personal toilet facility device according to an embodiment of the present invention.

Referring to FIG. 2, a perspective view of a portable personal toilet facility device of the present invention is shown generally at 201. A case bottom 1 is attached to a case top 2 by a hinge 3. Also attached to case bottom 1 by hinge 3 is a seat 4.

Case bottom 1 has a stop surface 16 with a plurality of slotted holes 17 and an access hole 18. Stop surface 16 prevents seat 4 from traveling past a position defined by the vertical dimensional position of stop surface 16. Case bottom 1, stop surface 16, and seat 4 supports a user of the portable personal toilet facility device 201.

A disposable container 8 is detachably attached to seat 4 and is accessible through an opening 9 in seat 4. During use, waste is deposited through opening 9. Each end of a pinching rod 19 is pivotably attached to case top 2 at a pivot 20. Pinching rod 19 extends through slotted holes 17 and constricts disposable container 8 when portable personal toilet facility device 201 is in the closed position. In the open position of portable personal toilet facility device 201, pinching rod 19 allows full access to disposable container 8 through opening 9.

Closing one or more of a set of catches 11, in the closed position of portable personal toilet facility device 201, causes pressure on pinching rod 19 which causes firm constriction of disposable container 8 to prevent any leakage of contents from disposable container 8. Thus, in the closed position with catches 11 closed, portable personal toilet facility device 101 can be carried by handle 12 without leakage of contents from disposable container 8 and disposable container 8 can be used a multiplicity of times before disposal. A seal 27 between top 2 and bottom 1 prevents odors from escaping when in the closed position.

Partition wall 10 divides case top into a plurality of compartments 14. A strap 21 which holds supplies is detachably fixed to a surface 15 of compartment 14.

Referring to FIG. 3(i a), a perspective view of a portable personal toilet facility device of the present invention is shown generally at 301. Case bottom 1 is attached to case top 2 by hinge 3.

Figure 3A:
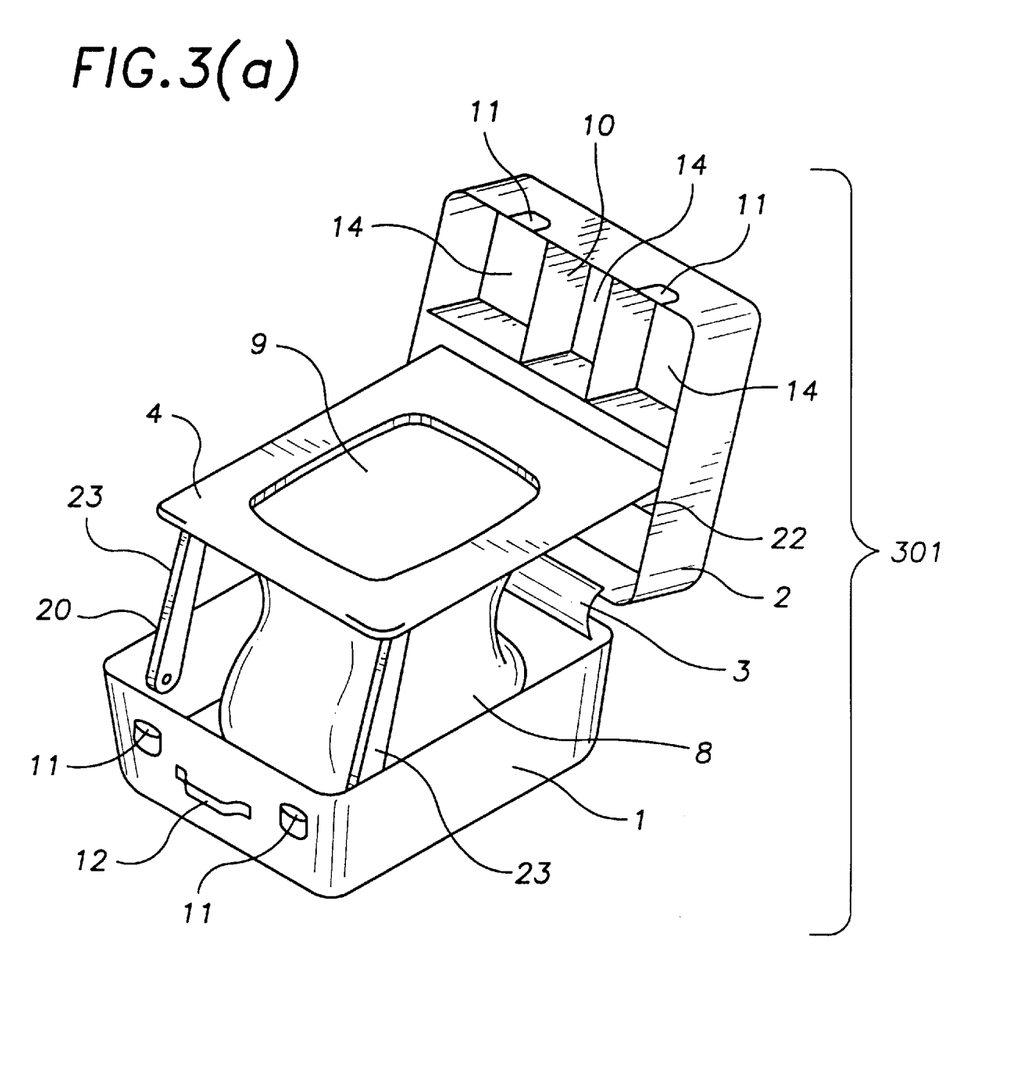
FIG. 3(a) is a perspective view of a portable personal toilet facility device according to an embodiment of the present invention.
Figure 3B:
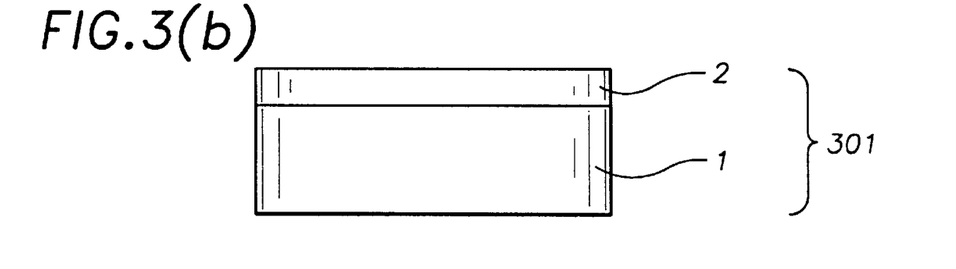
FIG. 3(b) is a side view of a portable personal toilet facility device in a closed state according to an embodiment of the present invention.
Figure 3C:
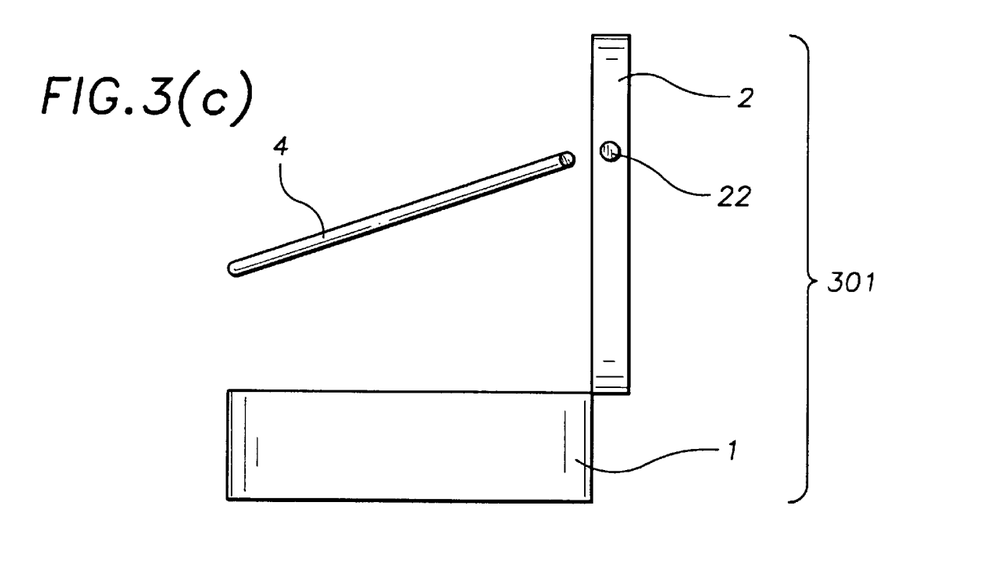
FIG. 3(c) is a side view of a portable personal toilet facility device in an intermediate open state according to an embodiment of the present invention.
Figure 3D:
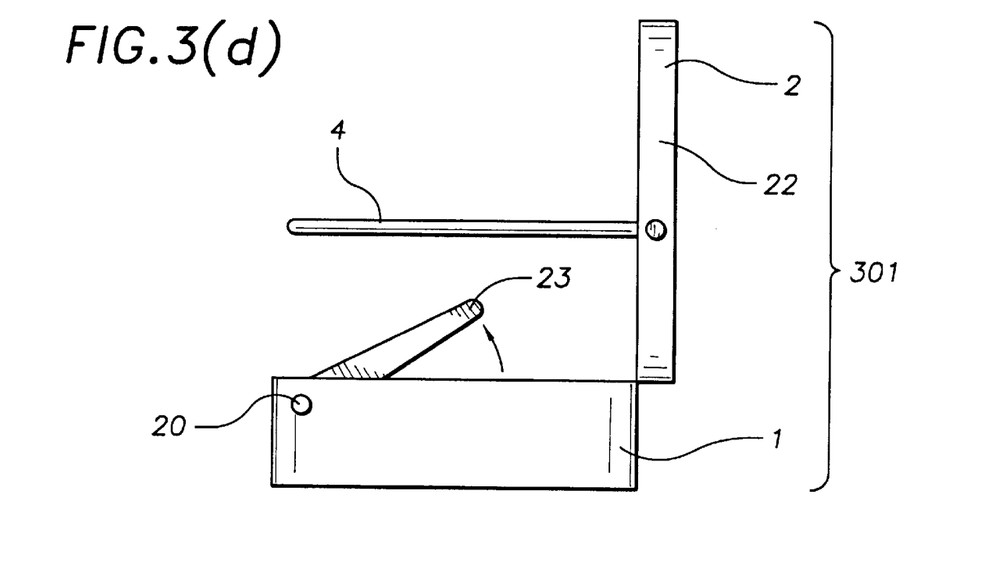
FIG. 3(d) is a side view of a portable personal toilet facility device in an intermediate open state according to an embodiment of the present invention.
Figure 3E:
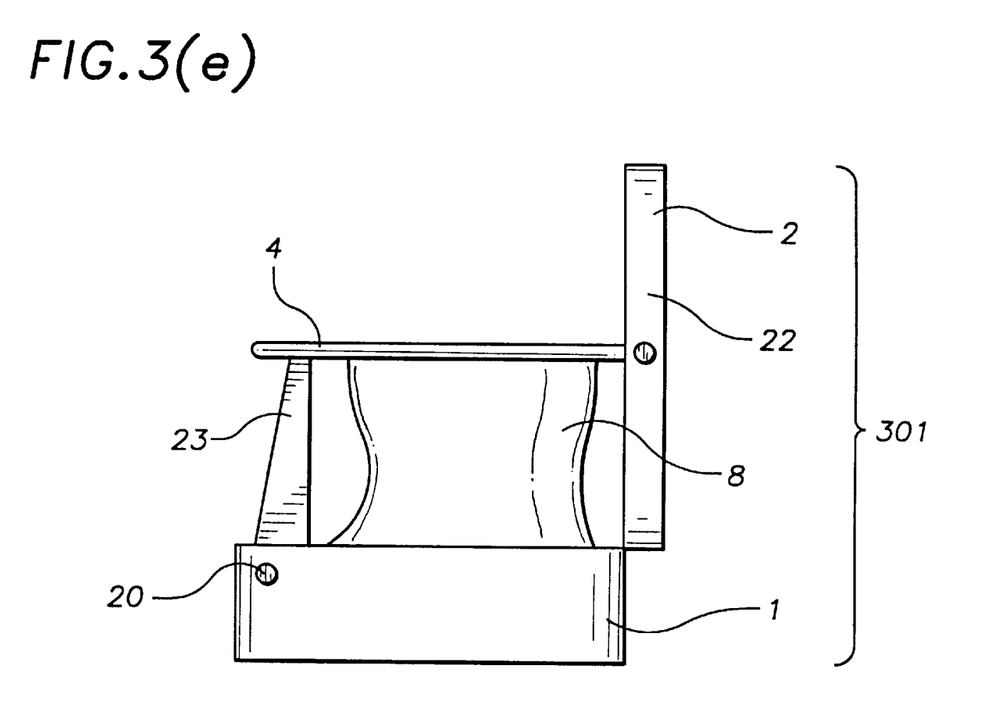
FIG. 3(e) is a side view of a portable personal toilet facility device in an open state according to an embodiment of the present invention.

Case top 2 has a convenient means to support seat 4, such as for example, struts, pins, hangers, hinges, or clips (not shown), or a support rod 22. Case bottom 1 has a plurality of convenient means to elevatingly support seat 4, such as for example, struts, scissor supports, pneumatic arms, or detachable props (not shown), or seat support legs 23 each pivotably attached to case bottom by pivot 20.

Referring to FIG. 3(i b), portable personal toilet facility device 301 is shown in the closed position.

Referring to FIG. 3(i c), portable personal toilet facility device 301 is shown in the open position with seat 4 in a position to be placed detachably fixed to support rod 22.

Referring to FIG. 3(i d), portable personal toilet facility device 301 is shown in the open position with seat 4 detachably fixed to support rod 22. Seat support leg 23 is shown in an intermediate position to pivot about pivot 20 to support seat 4.

Referring to FIG. 3(i e), portable personal toilet facility device 301 is shown in the open position with seat 4 detachably fixed to support rod 22. Seat 4 is also detachably fixed to support leg 23. Disposable container 8 is shown detachably fixed to seat 4.

Referring to FIG. 3(i a), case top 1, seat 4, support rod 22, and seat support legs 23 support a user of the portable personal toilet facility device 301.

A disposable container 8 is detachably attached to seat 4 and is accessible through an opening 9 in seat 4. Disposable container 8 is detached from seat 4 after use and disposed of.

Case top 2 has a plurality of compartments 14 separated by partitions 10. Convenient means, not shown, such as straps, doors, nets, webbing, hook and loop strips, or bags, are used to contain supplies such as tissue wipes, unused disposable containers 8, and used disposable containers 8, within compartments 14.

Closing one or more of a set of catches 11 effectively contains supplies, support legs 23, and seat 4 within container bottom 1 and container top 2. A seal, not shown, between container bottom 1 and container top 2 prevents offensive odors from emanating from closed portable personal toilet facility device 301 and prevents any spillage of loose contents.

Figure 4A:
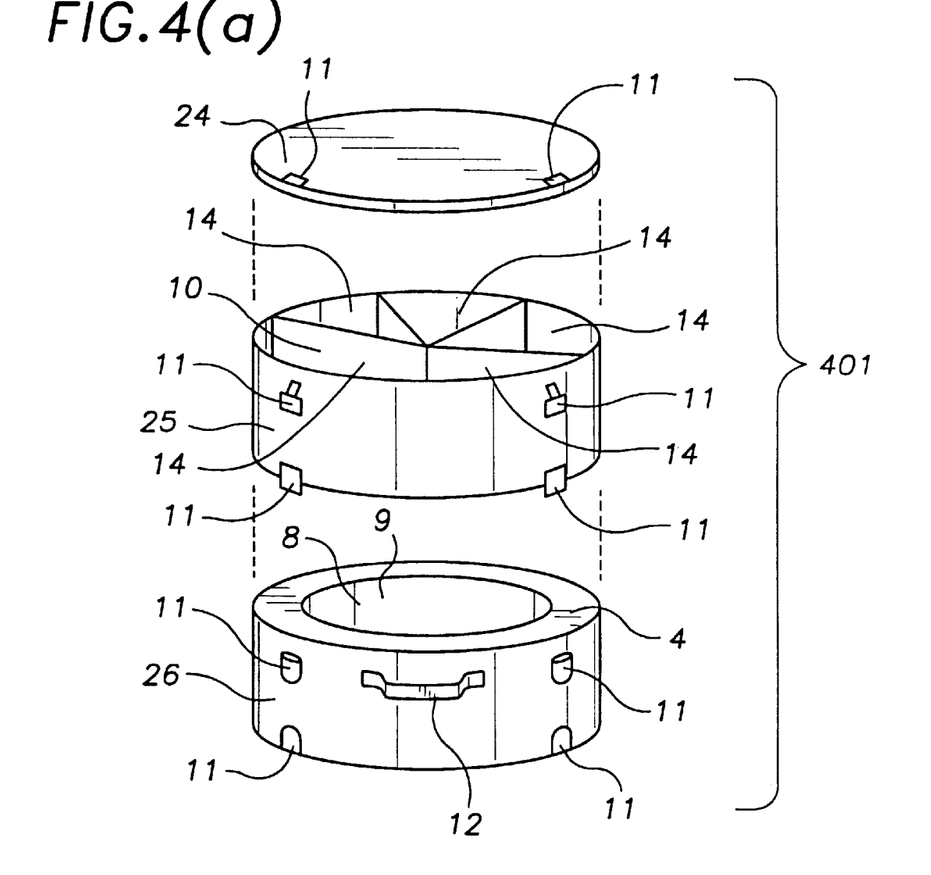
FIG. 4(a) is a perspective view of a portable personal toilet facility device in a storage or transporting configuration according to an embodiment of the present invention.

Referring to FIG. 4(i a) a portable personal toilet facility device 401 includes a cover 24, a storage section 25, and a receiving section 26. Receiving section 25 is accessible through an opening 9. A disposable container 8 is detachably attached around opening 9 effective to receive waste from a user. A seat 4, effective to support a user, during the use of portable personal toilet facility device 401, is formed proximate to opening 9.

Storage section 25 includes a plurality of compartments 14 effective to store new and used supplies. The orientation shown in FIG. 4(i a) is during transport or when portable personal toilet facility device 401 is not in use. Seals, not shown, such as O-rings, gaskets, or interlocking geometries, between cover 24, storage section 25 and receiving section 26 prevent spillage of solids or liquids, as well as preventing release of odors.

Figure 4B:
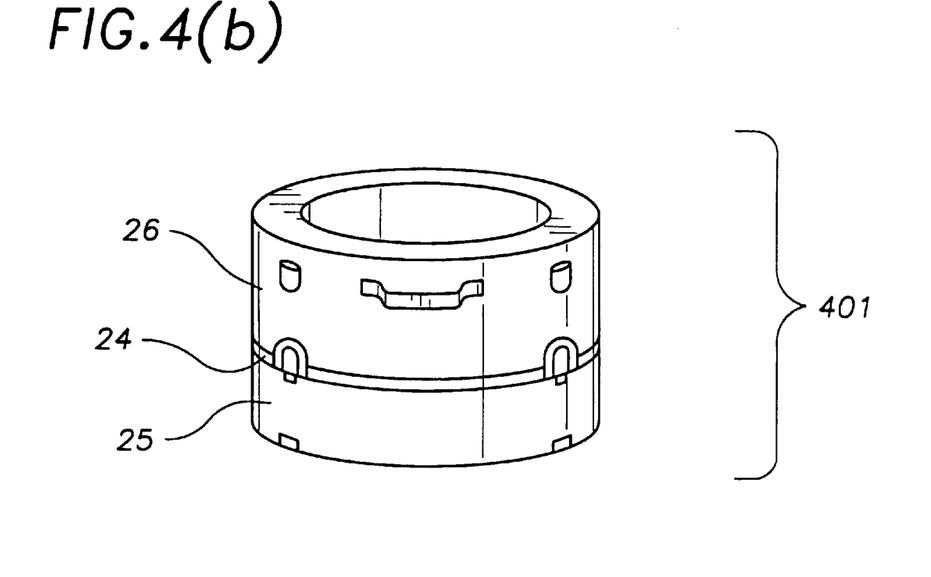
FIG. 4(b) is a perspective view of a portable personal toilet facility device in a configuration for use according to an embodiment of the present invention.

FIG. 4(i b) shows portable personal toilet facility device 401 in a configuration for use. Storage section 25 supports receiving section 26 to a convenient height for use. Cover 24 is optionally positioned between storage section 25 and receiving section 26 for convenience.

Disposable container 8 is preferably detached, sealed, and stored in a compartment 14 after use. However, it is contemplated that all surfaces of portable personal toilet facility device 401 are washable so that in the event of the unavailability of disposable container 8, or the depletion of stored supplies of new disposable containers 8, waste can be deposited directly into receiving section 26. Such deposited waste can be disposed of later and portable personal toilet facility device 401 can be easily washed afterwards. As described above, the bottom surface of storage section 25 would seal in such deposited waste to prevent any spillage from receiving section 26.

A plurality of convenient closing means such as clasps 11 are provided to maintain the sealing relations between cover 24, storage section 25, and receiving section 26. One or more handles are conveniently provided on portable personal toilet facility device 401 for ease of carrying. It is preferable that the handles be placed proximate to the longitudinally central region of portable personal toilet facility device 401 for balance and to provide a hand-hold during use.

It is contemplated by the present invention that privacy is a concern. Accordingly, the present invention includes a cloak 28, such as shown in FIG. 2, which fastens around a user's neck and is draped about the user to shield the user and the portable personal toilet from view during use. The cloak 28 is stored in one of the storage compartments when not in use. Such a cloak is commonly used, for example in a barber shop, to shield a similar area of anatomy. In the case of a barber shop use, the shield is for protection of the person from debris. A similar shield in the present invention protects the person from view.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment (s) without materially departing from the novel teachings and advantages of this invention. Accordingly, all such modifications are intended to be included within the scope of this invention as defined in the following claims, In the claims, means-plus-function clauses are intended to cover the structures described herein as performing the recited function and not only structural equivalents but also equivalent structures, This although a nail and screw may not be structural equivalents in that a nail relies entirely on friction between a wooden part and a cylindrical surface whereas a screw's helical surface positively engages the wooden part in the environment of fastening wooden parts, a nail and a screw may be equivalent structures.

What is claimed is:

1. A portable personal toilet facility device comprising:

a case;

a seat with an opening effective to allow a waste to pass through said opening;

a disposable container detachably attached to said seat, said disposable container effective to receive said waste deposited through said opening;

said case consisting of a top and a bottom;

first means for sealing said top to said bottom;

at least one compartment in said top effective to store new and used supplies; and second means for automatically sealing said disposable container connected to said top and said bottom, such that when said top is closed against said bottom, said case has a closed configuration effective to store said new and used supplies, said seat, and said waste, without spillage of solids and liquids, and without release of odors, in any orientation position of said case relative to the ground.

2. A portable personal toilet facility device according to claim 1 wherein said top includes a partition effective to separate one of said at least one compartment from another of said at least one compartment.

3. A portable personal toilet facility device according to claim 1, further including a privacy shield stored in said at least one compartment.

4. A portable personal toilet facility device according to claim 1, further comprising third means for supporting said top in a substantially vertical position when said case is in an open configuration.

5. A portable personal toilet facility device according to claim 4, wherein said second and third means are interconnected.

* * * * *